US010513333B2

(12) United States Patent
Johnson

(10) Patent No.: US 10,513,333 B2
(45) Date of Patent: Dec. 24, 2019

(54) DUCTED FAN PROPULSION ENGINE

(71) Applicant: Michael Johnson, Stafford, VA (US)

(72) Inventor: Michael Johnson, Stafford, VA (US)

(73) Assignee: Spydar Sensors, Inc., Fairfax, VA (US)

( * ) Notice: Subject to any disclaimer, the term of this patent is extended or adjusted under 35 U.S.C. 154(b) by 291 days.

(21) Appl. No.: 15/603,195

(22) Filed: May 23, 2017

(65) Prior Publication Data

US 2018/0201369 A1 Jul. 19, 2018

Related U.S. Application Data

(60) Provisional application No. 62/446,387, filed on Jan. 14, 2017.

(51) Int. Cl.
*B63H 1/06* (2006.01)
*B64C 29/00* (2006.01)

(52) U.S. Cl.
CPC ................. *B64C 29/0033* (2013.01)

(58) Field of Classification Search
CPC ......... B64C 3/32; B64C 11/001; B64C 27/28; B64C 29/0008; B64C 29/0016; B64C 29/0025; B64C 29/0033; B64C 35/04

USPC .................................... 416/155, 158
See application file for complete search history.

(56) References Cited

U.S. PATENT DOCUMENTS

| 2016/0214710 A1* | 7/2016 | Brody ................. B64C 29/0033 |
| 2018/0057157 A1* | 3/2018 | Groninga ................ B64C 27/82 |
| 2018/0208296 A1* | 7/2018 | Mores ..................... B64C 27/20 |
| 2018/0272856 A1* | 9/2018 | Manning ............... B64C 31/032 |
| 2019/0061932 A1* | 2/2019 | Kita ..................... B64C 29/0025 |

\* cited by examiner

*Primary Examiner* — John Kwon
(74) *Attorney, Agent, or Firm* — Law Office of Jeff Williams PLLC; J. Oliver Williams

(57) ABSTRACT

A propulsion engine for an aircraft comprises an enclosure having a longitudinal axis oriented in a direction of travel of an aircraft, the enclosure including a series of walls and a plurality of ducts arranged along the longitudinal axis. Each of the ducts including a number of walls that are either dynamic or static in movement. Each of the ducts includes a central axis that is angled at, or can be adjusted to, an angle toward the front wall of the enclosure such that a top end of each duct is toward the front wall of the enclosure. A fan is disposed in each of the ducts configured to generate airflow along the respective central axes from the top end to the bottom end to provide lift and thrust to the aircraft.

20 Claims, 8 Drawing Sheets

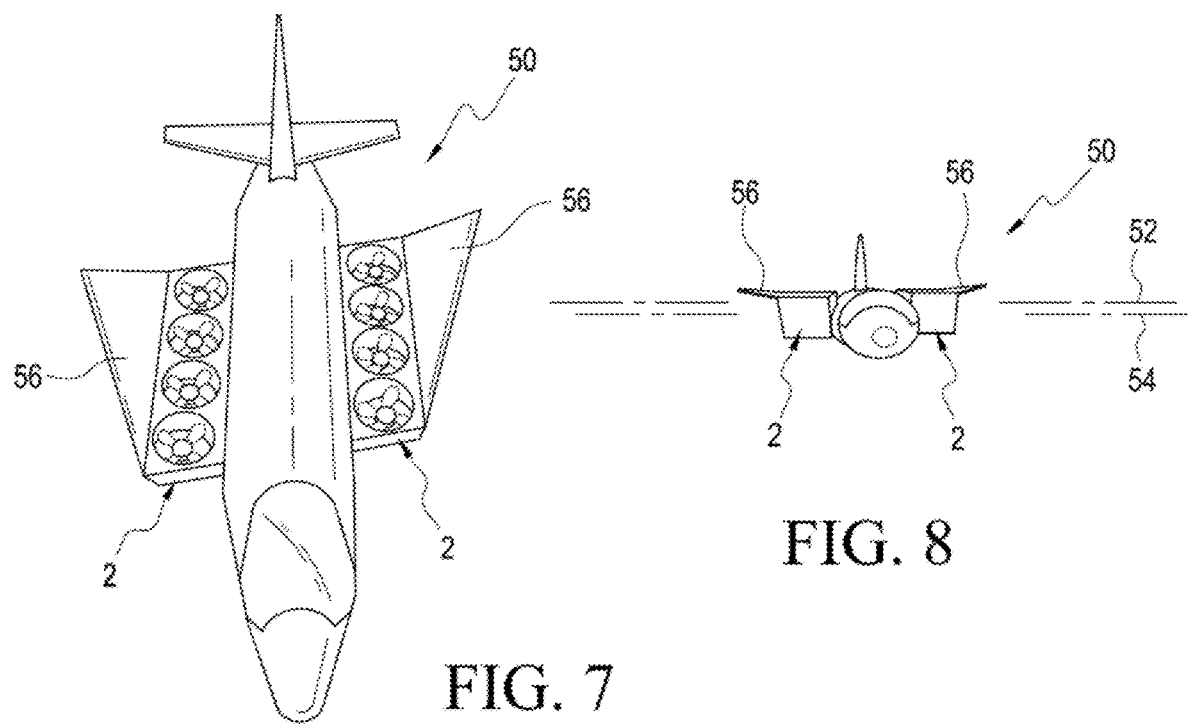
FIG. 7
FIG. 8
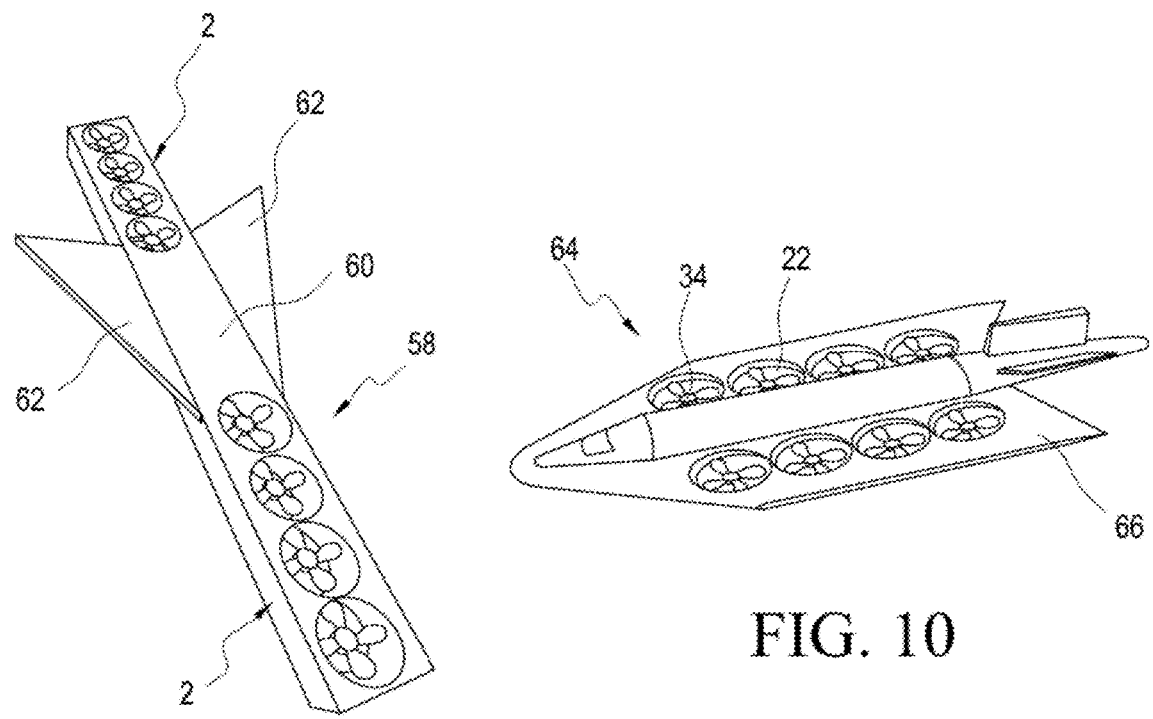
FIG. 9
FIG. 10

DUCTED FAN PROPULSION ENGINE

CLAIM OF PRIORITY

This application claims the benefit of U.S. Provisional Application No. 62/446,387, filed 14 Jan. 2017. The information contained therein is hereby incorporated by reference.

BACKGROUND

1. Field of the Invention

The present invention is generally directed to ducted fan propulsion engines for aircrafts.

2. Description of Related Art

Vertical takeoff and landing (VTOL) is a highly-sought capability in aeronautics. The ability to ascend vertically bypasses the need for large horizontal surface areas from which to launch or land an aircraft. Unfortunately, the design needed to ascend and descend vertically does not comport well with the design needed for high speed forward flight. Helicopters offer efficient hovering but are encumbered by severe drag in high speed forward flight. Propeller driven or jet aircrafts minimize their drag to enable high speed forward flight and rely on their fixed wings for lift, which of course offer no VTOL capability.

Ducted propeller technology has the potential to offer both VTOL capability and high speed forward flight. Historically, attempts to develop VTOL aircraft with high speed capability (>200 knots) have repeatedly encountered difficulty in meeting speed, range, and payload requirements owing to excessive power and/or fuel requirements, high weight-empty fraction, or poor cruise efficiency. The advancement of electrical power storage systems and research into drone technology has increased the interest in ducted fans due to their safety, efficiency, and cost.

Ducted fans can have significantly greater static thrust when compared to an open propeller of the same diameter and power loading. For a ducted fan, operating statically, net pressures on the duct inner surface will contribute to thrust if the inlet area is larger than the outlet area (positive camber).

The principal drawback to the use of ducted fans is the significant drag that occurs at higher speeds due to the increased surface area. When the ducts are aligned perpendicular to the direction of travel and the ducts are used for uplift, the need to turn the air 90 degrees also incurs a high momentum drag penalty.

If is for this reason that most research has focused on preserving the design features which enables enhanced vertical thrust and minimizing the drag penalty in forward flight. This has caused the field to mostly overlook another attribute of ducted fans—the ability to vector thrust. Whereas the wake from an open propeller is largely uncontrolled, ducted fans have the ability to direct their wake so as to prevent downstream interference. This means that ducted fans have the ability to be used in unique design series. This invention retains the vertical thrust capability of ducted fans and significantly reduces the drag problem normally associated with ducted fans in forward flight.

Although progress has been made with respect to flight and in particular to vertical takeoff and landing aircraft, considerable shortcomings remain. The present invention seeks to leverage the advantage of ducted fans while minimizing their principal drawback by engineering the duct form to be used in series so as to reduce drag.

The invention enables rotors to be added in a series without significant increase of drag. This allows for aircraft to retain the high disk area needed for a high vertical takeoff and landing force and more efficient hovering.

In addition, performing suction along the longitudinal axis of an aircraft assists in maintaining laminar flow across the fuselage or wing and reducing drag. This boundary layer ingestion will lead to high propulsive efficiency by re-energizing the slower moving turbulent wake from an aircraft's fuselage.

SUMMARY OF THE INVENTION

The present application provides a propulsion engine for an aircraft, comprising an enclosure having a longitudinal axis oriented in a direction of travel of an aircraft, the enclosure including a front wall, a rear wall, a left side wall, and a right side wall, the front wall and the rear wall configured to rotate between a first orientation and a second orientation. A plurality of ducts are arranged along the longitudinal axis. Each of the ducts including a central axis that is configured to change relative to the orientation of the front wall and the rear wall. A fan is disposed in each of the ducts and is configured to generate airflow along the respective central axes from the top end to the bottom end to provide lift and thrust to the aircraft.

The present application also provides a propulsion engine for an aircraft, comprising an enclosure having a longitudinal axis oriented in a direction of travel of an aircraft, the enclosure including top and bottom walls, front and rear walls and left and right side walls; and a plurality of ducts arranged along the longitudinal axis, each of the ducts including a top end intersecting and terminating at the top wall of the enclosure, each of the ducts including a bottom end intersecting and terminating at the bottom wall of the enclosure. Each of the ducts includes a central axis angled toward the front wall of the enclosure such that the top end of each duct is toward the front wall of the enclosure. A fan is disposed in each of the ducts configured to generate airflow along the respective central axes from the top end to the bottom end to provide lift and thrust to the aircraft. The present application also contemplates the use of static and dynamic ducts to further increase efficiency.

The present application also provides an aircraft equipped with the above propulsion engines.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 7 is a top perspective view of an aircraft equipped with the propulsion engine of FIG. 1 on each side.

FIG. 8 is a front elevational view of FIG. 7.

FIG. 9 is a top perspective view of another embodiment of an aircraft equipped with the propulsion engine of FIG. 1.

FIG. 10 is a top perspective view of still another embodiment of an aircraft equipped with the propulsion engine of FIG. 1.

Figure 1:
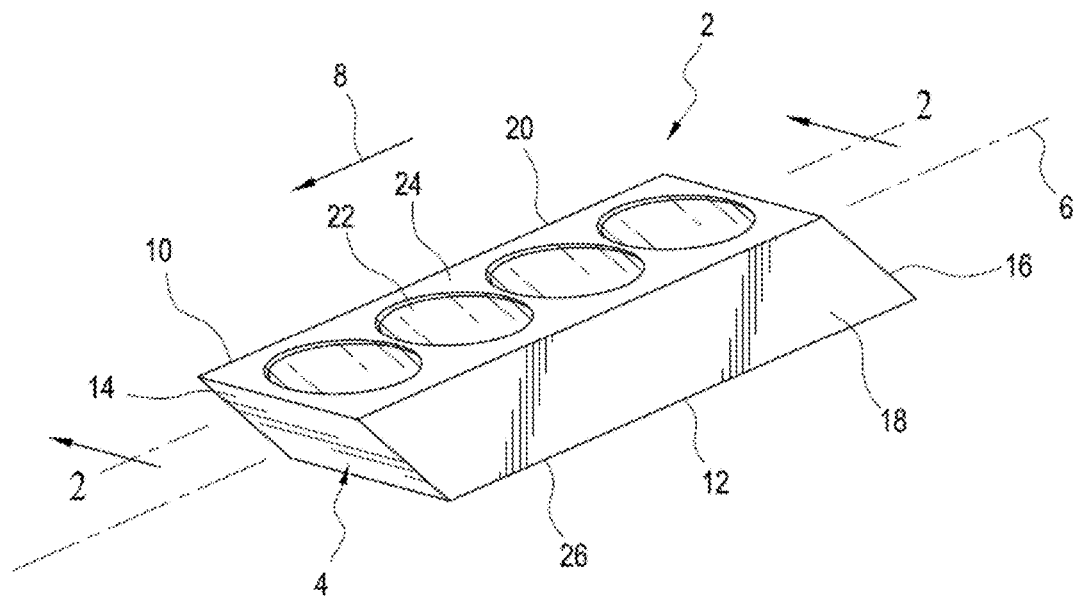
FIG. 1 is a perspective view of a propulsion engine embodying the present invention.
Figure 2:
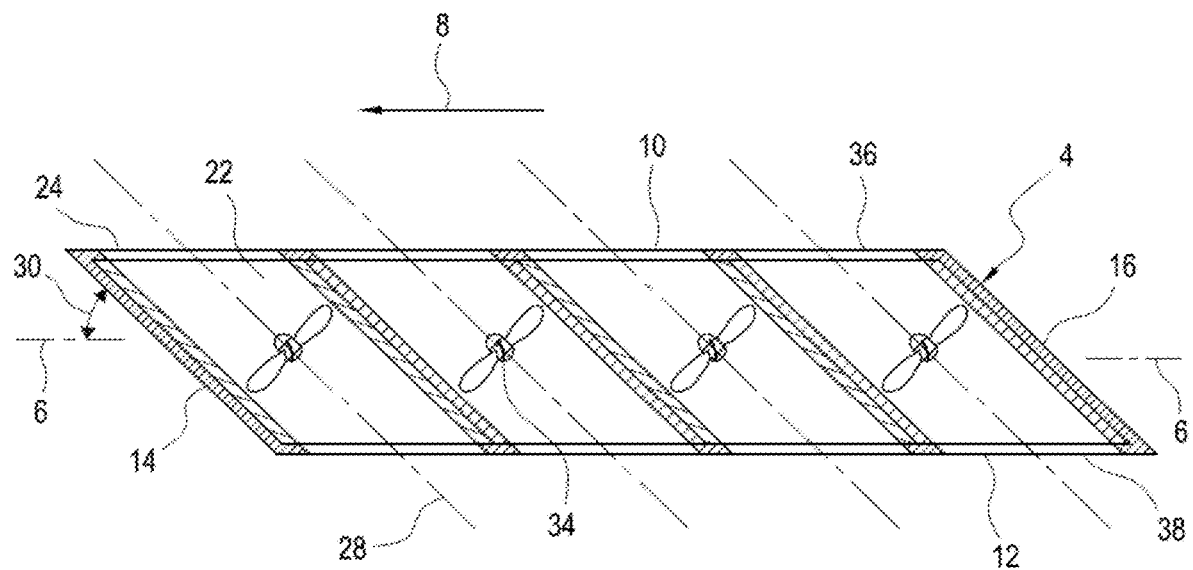
FIG. 2 is a cross-sectional view along line 2-2 in FIG. 1.
Figure 3:
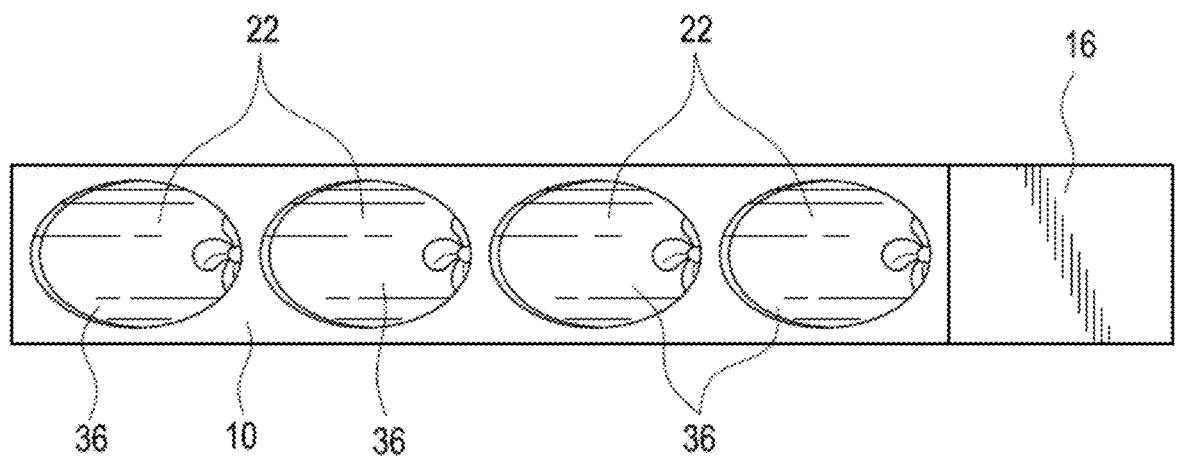
FIG. 3 is a top view of FIG. 1.
Figure 4:
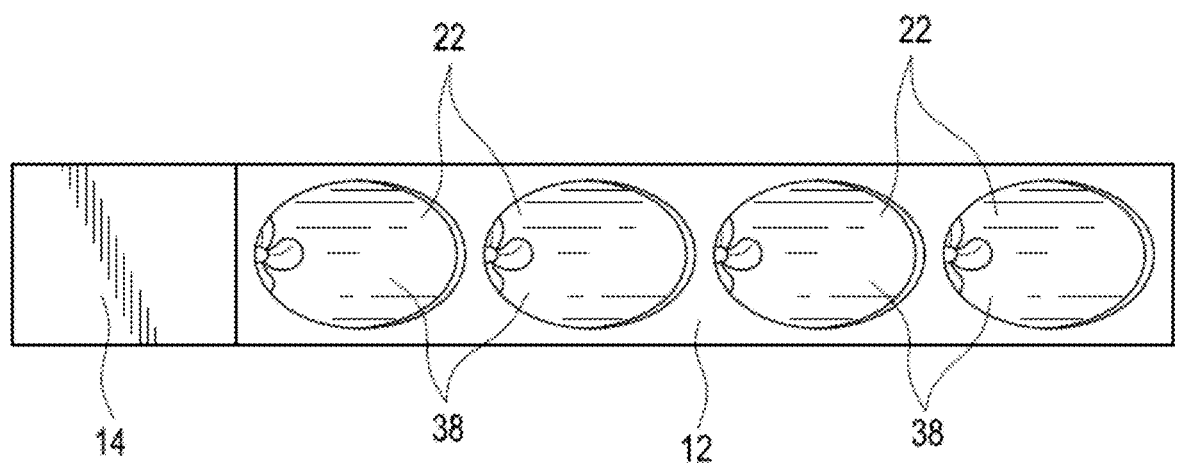
FIG. 4 is a bottom view of FIG. 1.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with conventional VTOL aircraft methods. In particular, the present application describes a system and aircraft that utilizes a shrouded propeller system aligned in series along a portion of the aircraft body. Both cylindrical and rectangular shrouds are described. Additionally, both static and dynamic systems related to articulating the shrouds is provided. The different embodiments are designed to increase efficiency. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the drawings wherein like reference characters identify corresponding or similar elements in form and function throughout the several views. Referring to FIGS. 1-4, a propulsion engine 2 made in accordance with the present invention is disclosed. The propulsion engine 2 has a shroud or enclosure 4 with a longitudinal axis 6 oriented in the direction of travel 8 of an aircraft. The enclosure 4 includes a top wall 10, a bottom wall 12, a front wall 14, a rear wall 16, a left side wall 18 and right side wall 20. A plurality of cylindrical ducts 22 are arranged in series along the longitudinal axis 6. Although four ducts are shown, more or less number may be used, depending on the aircraft. The longitudinal axis 6 preferably runs through the center of each of the ducts 22. Each of the cylindrical ducts 22 includes a top end 24 intersecting and terminating at the top wall 10 and a bottom end 26 intersecting and terminating at the bottom wall 12 of the enclosure 4.

Each of the cylindrical ducts 22 includes a central axis 28 angled at an angle 30 from the longitudinal axis 6 toward the front wall 14 of the enclosure 4 such that the top end 24 of each duct is toward the front wall 14 of the enclosure 4. Each of the central axes 28 preferably intersects the longitudinal axis 6 such that the cylindrical ducts 22 line up along the longitudinal axis 6. The central axes 28 are preferably parallel to each other.

A fan 34 is disposed in each of the ducts 22 configured to generate airflow along the respective central axes 28 in the direction from the top end 24 of each duct 22 to the bottom end 26 to provide lift and thrust to the aircraft. Each fan 34 may be driven by an electric motor. An engine driving an electric generator or batteries may be used to provide power to the electric motor.

The exterior surface of the top wall 10 of the enclosure 4 may be flat with the top end 24 of each duct making an elliptical inlet opening 36 with the top wall 10 as viewed vertically from the top. The inlet 36 is preferably flush with the top wall 10. The elliptical inlet openings 36 advantageously function as a scoop during flight. The flat exterior surface of the top wall 10 advantageously helps to minimize turbulence during forward flight.

The elliptical shape of the inlet opening 36 is due to the natural extension of an angled tubular duct intersecting the planar surface at the top of the enclosure 4. The elliptical inlet 36 advantageously enables a lower turning momentum from the freestream air above into the duct during forward flight. When the inlet opening 36 intersects with the curved top surface (see FIG. 5), then the curved ellipse may also function as a lip to induce greater airflow into the duct. The top wall 10 of the enclosure 4 may be either curved or flat.

The bottom wall 12 of the enclosure 4 may be flat with elliptical outlet openings 38 from the intersection of the ducts 22 with the bottom wall 12. The enclosure 4 advantageously shields the thrusted air exiting the outlets 38 from the external freestream air and vector the near field wake away from the aircraft to avoid downstream turbulence and hence drag. Without the enclosure 4, the wake from the fans would be pushed by the freestream air into the downstream fans, which would cause turbulence/drag. The geometric shape of the enclosure 4, with the front wall 14 preferably angled to reduce resistance to airflow during flight, advantageously ensures laminar flow during forward flight.

The inlet 36 and the outlet 38 can be different sizes and shapes. While it is essential that the outlet 38 shields the wake from the freestream air compressing it against a downstream duct, the inlet 36 can derive benefit from aspirating as much of the free stream air as possible.

The sides of the enclosure 4 may be either curved or straight. The central requirement for the sides of the enclosure 4 is that they are planar to the flow of air or the direction of travel.

Figure 5:
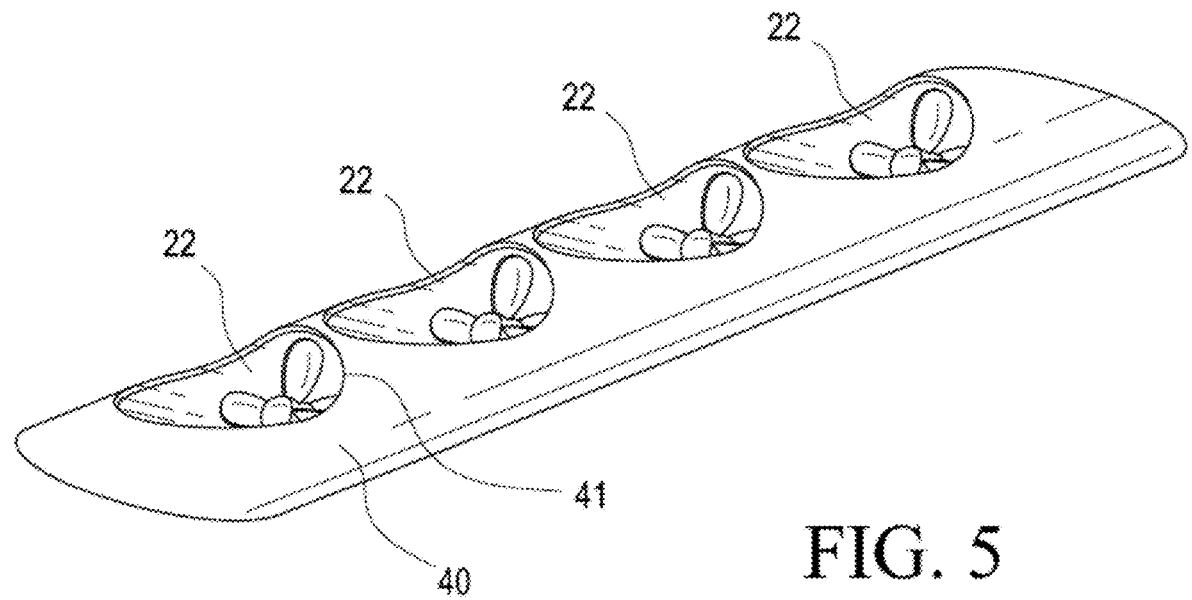
FIG. 5 is a perspective view of a propulsion engine showing a cylindrical enclosure.

Referring to FIG. 5, a cylindrical enclosure 40 may be used in lieu of the angular enclosure 4 to advantageously reduce resistance to airflow during flight. The cylindrical enclosure 40 advantageously provides the inlet 36 with the annular lip 41 to preserve the lift advantage of ducted fans.

Figure 6:
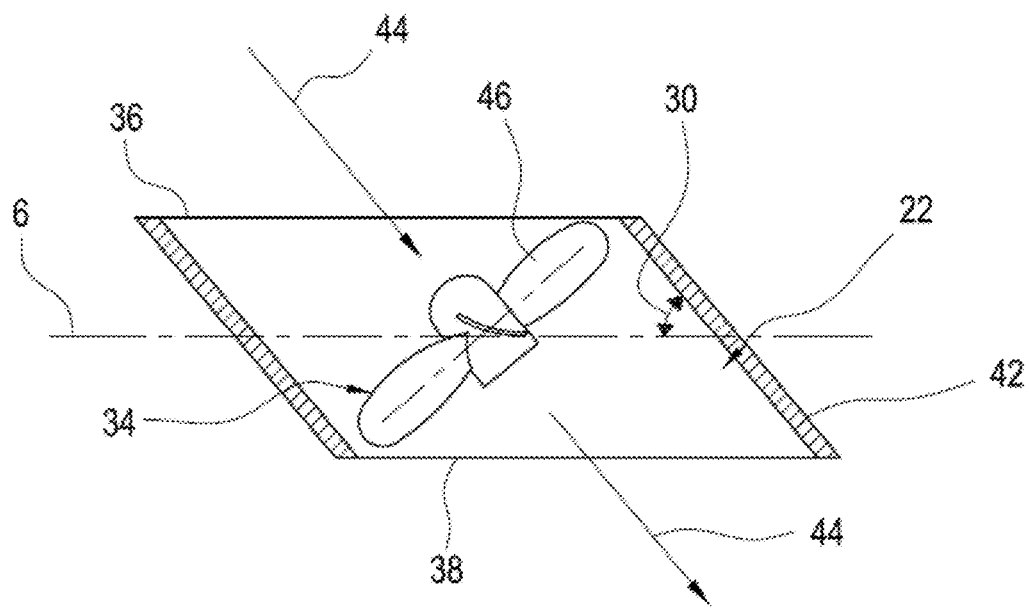
FIG. 6 is a schematic cross-sectional view of a ducted fan.

Referring to FIG. 6, each of the ducts 22 includes a wall 42, which is preferably parallel to the airflow 44 generated by the fan 34. The plane 46 of the rotating blades of the fan 34 is preferably perpendicular to the wall 42. The wall 42 is preferably at the acute angle 30 to the longitudinal axis 6.

The selection of the angle 30 advantageously determines whether more vertical or horizontal lift will be produced. The propulsion engine 2 advantageously provides the capability of increasing thrust by adding additional ducts 22 and fans 34 while retaining laminar flow and minimizing forward facing drag.

The range of the angle 30 may encompass between 0°-90°. A preferred range is between 30° and 75°. Any angle below approximately 30° may be used but it might form an excessively long duct which would both limit the number of rotors that could be used and increase skin drag with in the tube. Angles above approximately 75° may also be used but it might limit horizontal thrust.

An optimum range for the angle 30 is 30°-45°. The angle selected is a function of the operational role of the aircraft. If vertical lift is more required, then the angle will be more towards 45°. If forward thrust is more needed, then the angle 30 will be more towards 30°.

The enclosure 4 may be tiltable to advantageously provide a further range for the angle 30, such as 40°-50° to maximize forward thrust when the ducts are aligned. Movable vanes or deflectors may also be provided at the outlets 38 to advantageously provide additional thrust if needed.

Referring to FIGS. 7 and 8, an aircraft 50 equipped with the propulsion engines 2 is disclosed. Each of the propulsion engines 2 is attached to the respective side of the aircraft. The propulsion engines are preferably installed near the top of the fuselage, with an axis 52 being above an axis 54 to increase aircraft stability. The axis 52 preferably intersects the axis 6. The axis 54 intersects the center of gravity of the aircraft. Wings 56 may be attached to the lateral sides of the respective propulsion engines 2 for added stability during flight. The side walls of the enclosure attached to the aircraft may be integrated with wall of the aircraft.

Referring to FIG. 9, another embodiment of an aircraft 58 employing the propulsion engines 2 is disclosed. The aircraft 58 has the propulsion engines 2 attached to the front and rear ends of the fuselage 60. Wings 62 are attached to the sides of the fuselage 46 for added stability during flight.

Referring to FIG. 10, another embodiment of an aircraft 64 employing the propulsion engines 2 is disclosed. The enclosure 4 shown in FIG. 1 is preferably integrated with the aircraft as blended wings 66 to advantageously provide an aerodynamic shape. The angle 30 of each cylindrical duct 34 is preferably 15° to provide more thrust, since the wings 66 provide more lift than the other embodiments shown.

The ability to vector thrust is a key attribute of ducted fans. Whereas a VTOL aircraft that uses an open propeller must rely upon large and complex mechanical adjustments, a ducted fan can direct its wake with simple outlet vanes for far more precise maneuvering. Additional benefits of ducted fans include safety and noise reduction, both of which are essential if VTOL aircraft are to be developed for wide spread commercial use.

Ducted fans are sometimes referred to as 'cold jets'. This refers to the high speed directed propulsion ability of ducted fans. Tilting of the propulsion engine 2 may be provided to increase the angle 30 during VTOL or hover. The capability to vector thrust has the obvious benefit of being able to conduct relatively precise maneuvers. The ducts 22, since they are disposed at an acute angle, advantageously provide vectoring high speed wake away from the aircraft. The ducts 22 will advantageously direct thrust into the bottom flowing freestream air.

Fixed circular ducted fans/rotors with exit control vanes are one type of a multi-duct acutely positioned engine (MDAPE). In this configuration the assembly of motors/rotors/blades/ducts does not move. Instead, exit control vanes internal to the duct augment lift or vertical thrust. The addition of exit control vanes are relatively simple to include with a static fan within a shroud. They can be much simpler especially if the fans/rotors did not need to pivot. This also means less weight. Instead, all that would be required are for exit control vanes to manipulate the wake. Naturally the inclusion of exit control vanes does lead to some decreased efficiency. Exit control vanes may be included in the embodiments of FIGS. 1-10 as described above.

FIGS. 1-10 are primarily provided to describe a static duct configuration wherein a particular angle 30 is maintained (although the precise angle is selectable). As noted above, a tiltable enclosure can provide increased benefits of minimizing drag in forward flight, increasing forward thrust, and also increasing vertical thrust. Rotatable or pivoting duct shrouds would lend themselves to one of two types of configurations, namely 1) where each fan includes its own complete shroud enclosure independent from neighboring fans and is configured to adjust its own angular orientation relative to the needs of VTOL flight and forward flight; and 2) where each a single shroud enclosure is made up of the plurality of fans sharing some walls, and that some of the shared internal walls pivot with each fan, but that as a whole the entire shroud does not move.

In the rotation of circular ducted rotors, the duct and rotors rotate to enable efficient hover/vertical takeoff. No exit control vanes are needed. Implementation of this would necessitate a degree of precision. In the case of reticular shaped ducts, the ducts are cube shaped. This can be less efficient than the use of vanes and circular ducted rotors but there is no need for exit control vanes and the rotation from hover to forward flight is easily achieved.

Referring now also to FIGS. 11-18, associated views illustrating the function of tilting or pivoting shroud and fan assemblies are provided. In these embodiments, selected portions of enclosure 4 will be configured to pivot or rotate about an axis A. As seen in FIG. 1, the elements of enclosure 4 were rigidly affixed to one another. In an effort to generate a MDAPE system, selected portions of enclosure 4 need to move. For example, this new enclosure 101 could include the top wall and optionally the bottom wall if desired. Furthermore, the front wall and rear wall would be able to pivot. The side walls would conceivably be static so as to act as a support for the motion of the fans and the front and rear wall.

Figure 11:
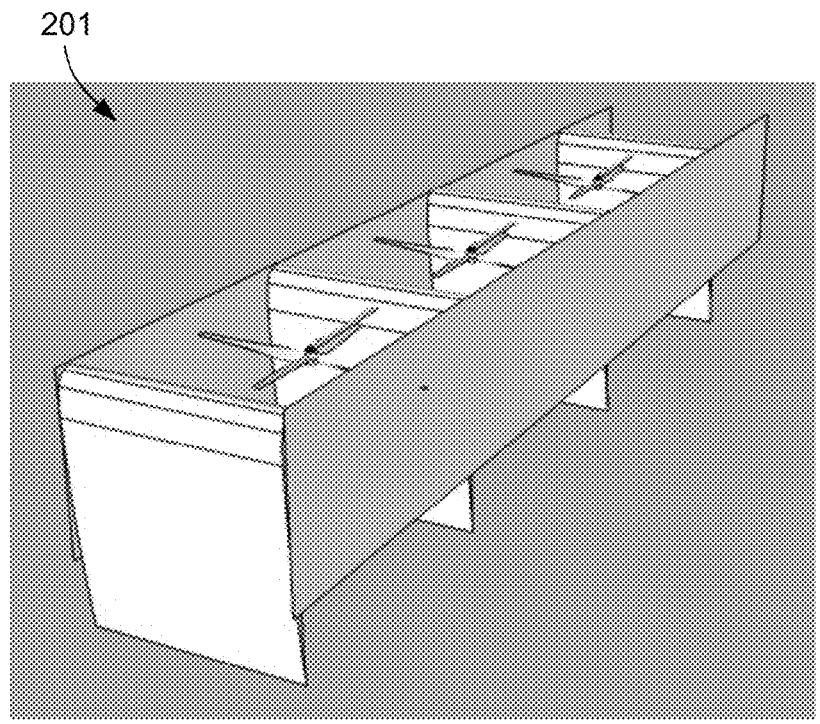
FIG. 11 is a perspective view of a movable enclosure assembly for use with the propulsion engine of FIG. 1.
Figure 12:
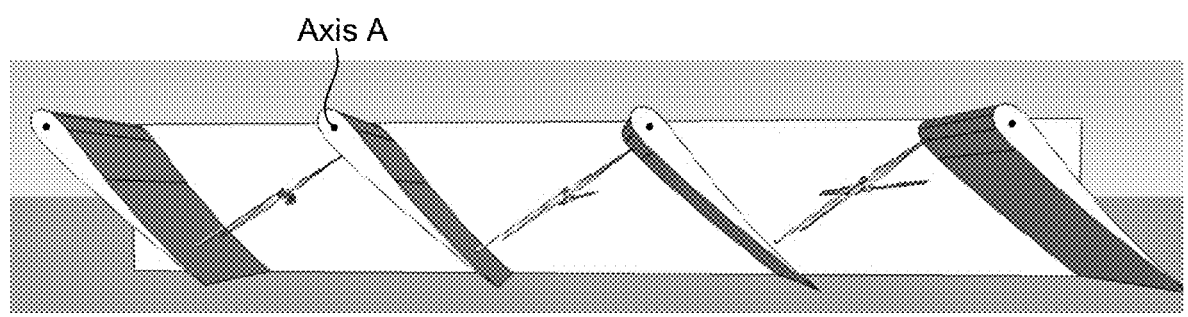
FIG. 12 is a partial side view of the movable enclosure assembly of FIG. 11.

FIG. 11 illustrates an exemplary perspective view of an embodiment where the top wall and bottom walls are removed, the front 103 and rear 105 walls pivot, and the side walls are static in position. In FIG. 11, the front walls and rear walls are relatively vertically oriented. In FIG. 12, the front and rear walls are illustrated in a pivoted orientation. Walls 103 and 105 are operably functional between these two orientations. The orientation of FIG. 11 is ideal for VTOL while the orientation of FIG. 12 is ideal for forward flight. Of note is that the front and rear walls extend below the side walls in FIG. 11. As vertical lift is desired, this is not much if any of a hindrance for drag. When converted to forward flight (FIG. 12), the bottom tips of the front and rear walls are now within the side walls. Drag is further minimized such that the front wall to the shroud body as a whole is angled at the angle of the fans/rotor blades.

It is determined that each fan would be coupled to one of the walls so as to move simultaneously with the walls. Having the stator attached to the moving walls to permit simultaneous incline is useful because it is simple. If the rotor/stator was attached to the front wall then when inclined for forward flight the blade would protrude above the duct. A pusher configuration of the rotor is the only realistic answer if the rotor were attached via stator to the front wall but that causes additional problems and complexities. Attachment to the rear wall is the simplest configuration. Each of the configurations of FIGS. 11-18 are provided with the understanding that the stator is coupled to the rear wall.

Referring in particular to FIGS. 13-18 in the drawings, basic exemplary side views of various front and rear wall shapes are discussed for use in a MDAPE. The shape of the front and rear walls has an effect upon the performance of each individual shroud and the enclosure as a whole. With respect to FIGS. 13 and 14 a reticular duct with curved rotatable front and back walls is illustrated. This design is optimized for forward flight. CFD analysis and general principles of airflow have shown that by curving the ducts, both the drag decreases and the lift increases. When used in a series the curved ducts along with the turned air and angled rotors make for a very low angle of attack for downstream rotors.

Figure 13:
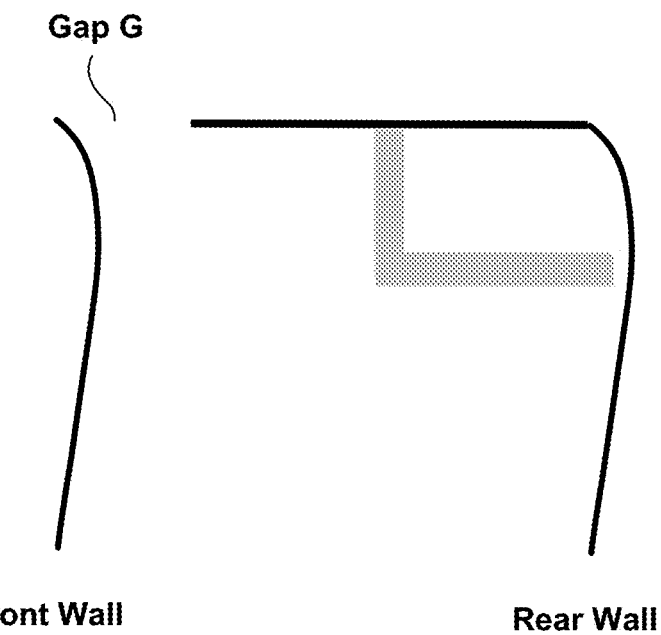
FIGS. 13-18 are exemplary side views of the movable enclosure assembly of FIG. 11 in selected orientations with various styled walls.
Figure 14:
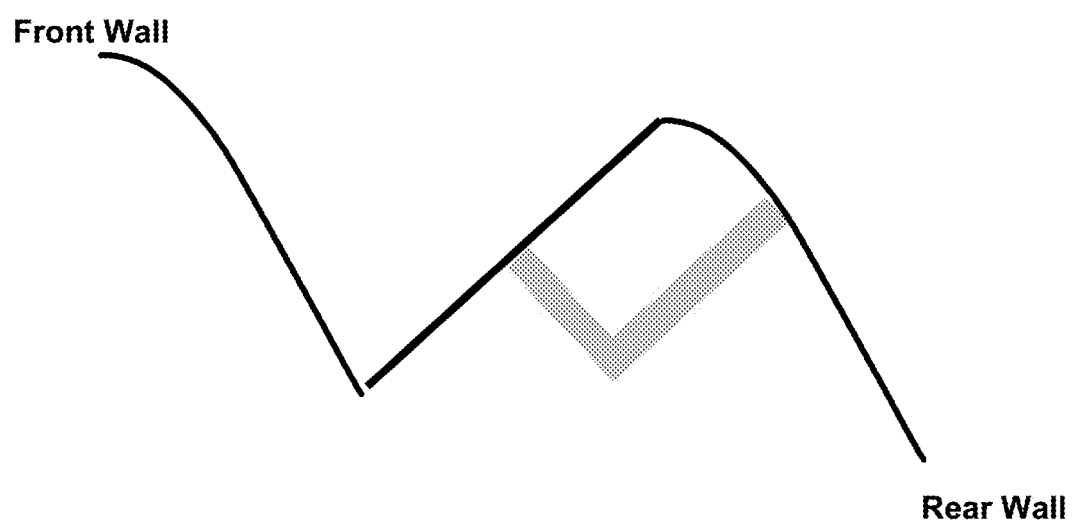
Figure 15:
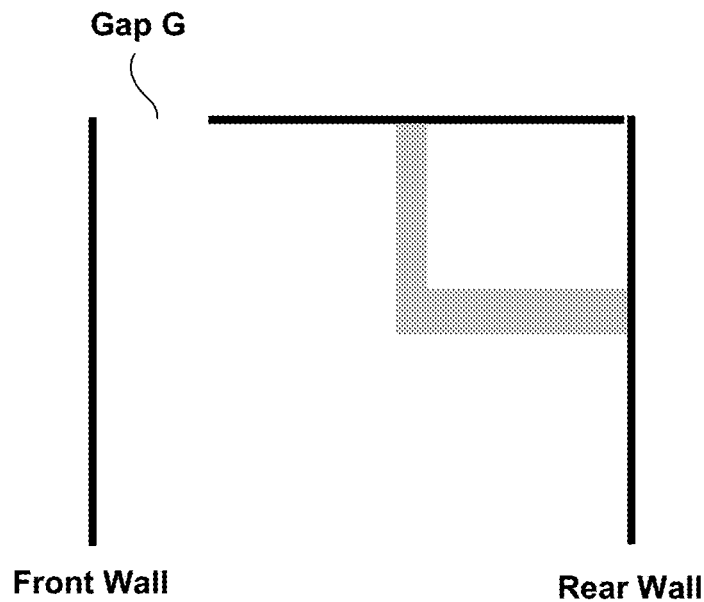
Figure 17:
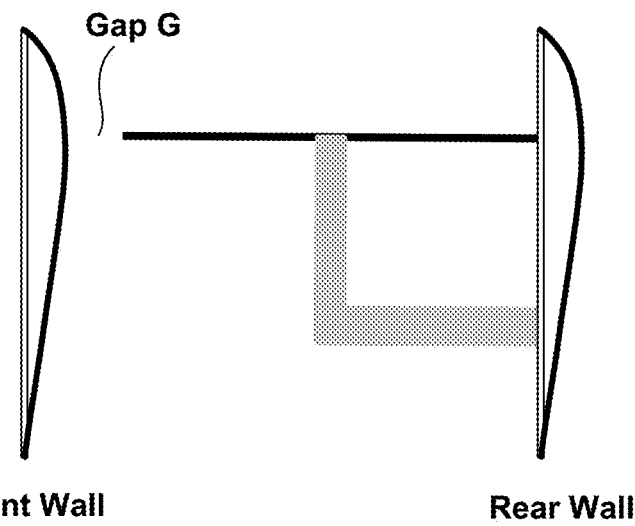

As seen in FIG. 13, there is some spacing between the rotor blades and the cambered wall as seen by gap G (also seen in FIGS. 15 and 17). The amount of spacing is determined upon design constraints and is selectable based upon engineering data. Minimizing the gap can help decrease drag during vertical flight but can become a limitation during pivoting of the walls. It is important to note that the distance or gap be sufficient to permit proper rotation into a forward flight orientation as seen in FIG. 14.

The front and rear walls can be thought to act similarly to that of a wing, but they fail to include the flat bottom surface. This is so that the airstream in the back wall can also be more gently turned as it passes through the fan/rotor. Of note is that it is useful to have the rotor located at the top tip of the wall duct during the vertical orientation so the wake does not directly press into the bottom of the duct. There will be a diffusion of pressure etc. but the idea is that if the rotor were placed inside the curved portion of the wall then, when there was vertical takeoff a portion of the rotors wake would directly hit the duct below it causing a backward force.

Figure 16:
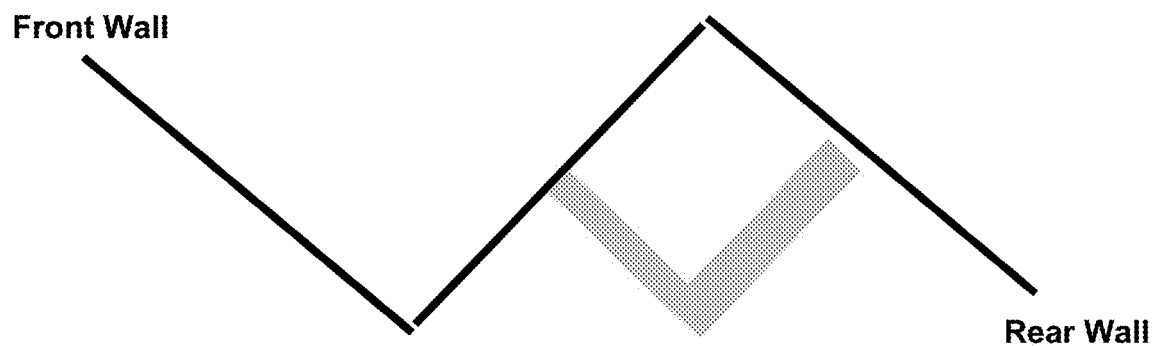

Referring now in particular to FIGS. 15 and 16 in the drawings, the front and rear walls are illustrated as being flat. FIG. 15 shows an orientation set for VTOL flight. FIG. 16 shows the duct oriented for forward flight. The duct is set to be angled at a 45 degree angle but the desired angle can be adjusted as needed. For the 45 degree angle the inlet opening needs to be approximately 1.414 times larger to ensure the rotor blades don't strike the wall when pivoted into forward flight. A disadvantage with flat walls is that the usefulness of a ducted fan becomes very minimal for vertical flight because the extra thrust associated with close lip is lost.

However, flat walls can provide a number of advantages. For example, flat walls are much simpler to manufacture and provide a great deal of breathable inlet/outlet area. Additionally, the turned air can move straight into the ducts without having to press against a top lip. For example, the entire assembly of upstream and downstream rotors becomes something like a square fan because the air is turned by upstream rotors.

Figure 18:
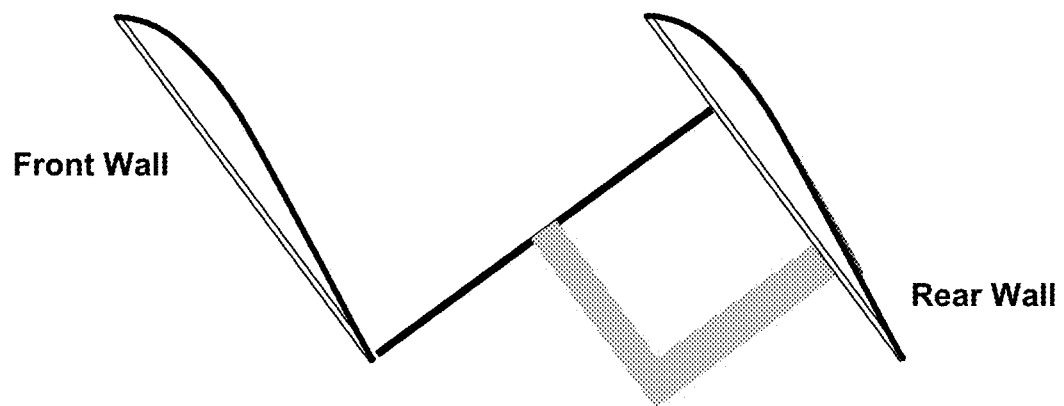

Referring now in particular to FIGS. 17 and 18 in the drawings, the front and rear walls are illustrated as being shaped like a wing wherein the curved nature of FIGS. 13 and 14 are combined with the flatness of FIGS. 15 and 16. In this configuration the lip of the rotor in vertical/hover mode (FIG. 17) is closer to the duct wall as a result of the curved portion of the front wall. This should allow greater thrust/less power as is the case in normal ducted fans. An advantage of this design is that the blades would be closer to the duct wall during vertical takeoff so this would allow for greater thrust. Additionally, during forward flight the air would be more gradually turned.

It should be remembered that the MDAPE design can be operable with both circular and rectangular ducts. Additionally, inlet opening and outlet openings can be selectively varied to affect performance with any of the above embodiments.

The particular embodiments disclosed above are illustrative only and are not intended to be exhaustive or to limit the invention to the precise form disclosed, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A propulsion engine for an aircraft, comprising:
   a) an enclosure having a longitudinal axis oriented in a direction of travel of an aircraft, the enclosure including a front wall, a rear wall, a left side wall, and a right side wall, the front wall and the rear wall configured to rotate between a first orientation and a second orientation such that a cross-sectional area of the enclosure is configured to change when rotated;
   b) a plurality of ducts arranged along the longitudinal axis, each of the ducts including a central axis that is configured to change relative to the orientation of the front wall and the rear wall; and d) a fan disposed in each of the ducts configured to generate airflow along the respective central axes from the top end to the bottom end to provide lift and thrust to the aircraft.

2. The propulsion engine for an aircraft as in claim 1, each of the ducts are configured to share a singular pivoting wall.

3. The propulsion engine for an aircraft as in claim 1, wherein each central axis makes an angle in a range of 30°-75° from a horizontal line in the second orientation.

4. The propulsion engine for an aircraft as in claim 1, wherein at least one of the front wall and the rear wall is flat.

5. The propulsion engine for an aircraft as in claim 1, wherein an outer surface of at least one of the front wall and the rear wall is curved.

6. The propulsion engine for an aircraft as in claim 1, wherein at least one of the front wall and the rear wall includes both a flat outer surface and a curved outer surface opposite from one another.

7. The propulsion engine for an aircraft as in claim 1, wherein the walls of the enclosure form a box.

8. The propulsion engine for an aircraft as in claim 1, wherein the walls of the enclosure is cylindrical.

9. A propulsion engine for an aircraft, comprising:
a) an enclosure having a longitudinal axis oriented in a direction of travel of an aircraft, the enclosure including top and bottom walls, front and rear walls, and left and right side walls;
b) a plurality of cylindrical ducts arranged along the longitudinal axis, each of the cylindrical ducts including a top end intersecting and terminating at the top wall of the enclosure, each of the cylindrical ducts including a bottom end intersecting and terminating at the bottom wall of the enclosure, the front wall and the rear wall each having a respective length;
c) each of the cylindrical ducts including a central axis angled toward the front wall of the enclosure such that the top end of each duct is toward the front wall of the enclosure; and
d) a fan disposed in each of the ducts configured to generate airflow along the respective central axes from the top end to the bottom end to provide lift and thrust to the aircraft, fan being located at a first location along the length of the first wall and at a second location along the length of the second wall, the first location and the second location being different.

10. The propulsion engine for an aircraft as in claim 9, wherein an outer surface of the front wall of the enclosure is angled upwardly and forwardly.

11. The propulsion engine for an aircraft as in claim 9, wherein each central axis makes an angle in a range of 30°-75° from a horizontal line clockwise.

12. The propulsion engine for an aircraft as in claim 9, wherein an outer surface of the top wall is flat.

13. The propulsion engine for an aircraft as in claim 9, wherein an outer surface of the bottom wall is flat.

14. The propulsion engine for an aircraft as in claim 9, wherein an outer surface of the side walls is flat.

15. The propulsion engine for an aircraft as in claim 9, wherein the walls of the enclosure form a box.

16. The propulsion engine for an aircraft as in claim 9, the enclosure is cylindrical.

17. The propulsion engine for an aircraft as in claim 9, wherein outside surfaces of the enclosure are streamlined.

18. The propulsion engine for an aircraft as in claim 9, wherein outer surfaces of the enclosure are streamlined to airflow in the direction of travel of the aircraft.

19. An aircraft comprising:
a) a fuselage having a first longitudinal axis along a direction of travel of the aircraft, the fuselage having a front end and a rear end;
b) first and second enclosures operably attached to the respective front end and the rear end of the aircraft, the first and second enclosures having a second longitudinal axes oriented in the direction of travel of the aircraft, the first and second enclosures including top and bottom walls, front and rear walls and left and right side walls;
c) a plurality of cylindrical ducts arranged along the respective second longitudinal axes, each of the cylindrical ducts including a top end intersecting and terminating at the top wall of the respective first and second enclosures, each of the cylindrical ducts including a bottom end intersecting and terminating at the respective bottom walls of the first and second enclosures, the front wall and the rear wall each having a respective length;
d) each of the cylindrical ducts including a central axis angled toward the front wall of the respective first and second enclosures such that the top end of each duct is toward the front wall of the respective first and second enclosures; and
e) a fan disposed in each of the ducts configured to generate airflow along the respective central axes from the top end to the bottom end to provide lift and thrust to the aircraft, fan being located at a first location along the length of the first wall and at a second location along the length of the second wall, the first location and the second location being different.

20. The aircraft as in claim as in claim 19, and further comprising first and second wings operably attached to the respective first and second enclosures.

* * * * *